United States Patent [19]

Mollet

[11] 4,397,192
[45] Aug. 9, 1983

[54] VORTEX FLOWMETERS

[75] Inventor: Jean-Paul Mollet, La Celle-Saint-Cloud, France

[73] Assignee: Flonic S.A., Montrouge, France

[21] Appl. No.: 251,454

[22] Filed: Apr. 6, 1981

[30] Foreign Application Priority Data

Apr. 11, 1980 [FR] France .............................. 80 08117

[51] Int. Cl.³ ............................................. G01F 1/32
[52] U.S. Cl. ................................................. 73/861.22
[58] Field of Search ........... 73/861.22, 861.23, 861.24, 73/198; 138/37

[56] References Cited

U.S. PATENT DOCUMENTS 3,965,730  6/1976  Innes .
4,228,768 10/1980  Kita .
4,280,360  7/1981  Kobayashi et al. ................... 73/198

Primary Examiner—Herbert Goldstein
Attorney, Agent, or Firm—Dale Gaudier

[57] ABSTRACT

A vortex fluid flowmeter adapted to measure the flow-rate of fluid passing through a conduit by measuring the frequency of emission of alternating vortices generated by an obstacle extending across the conduit, comprises a mesh structure mounted upstream of the vortex-shedding obstacle. Said mesh structure is constituted by a grid made of bars of wires of rectangular cross-section. The distance between the grid and the obstacle is so chosen that the obstacle be in the efficient working range of the grid.

4 Claims, 2 Drawing Figures

VORTEX FLOWMETERS

TECHNICAL FIELD

The present invention relates to vertex fluid flowmeters in which fluid flow through a conduit is measured by sensing the frequency of vortices generated by an obstacle placed across the conduit.

BACKGROUND OF THE INVENTION

In this kind of flowmeter the frequency of emission of the alternating vortices is related to the local speed of the fluid flow, and the measurement of this frequency permits the flowrate in the conduit to be obtained. The measurement of this frequency of emission is generally done by means of sensors responsive to the emission or the passage of the vortices and adapted to detect the alternating variations of local pressures resulting from their emission for producing an electrical signal related to the flowrate of the fluid.

The obstacle is generally chosen rectangular in cross section and placed diametrically across the conduit. In a large range of flowrates, the Strouhal number
$$S = (f \cdot d)/V$$
where
  f is the vortex frequency,
  d is the width of the obstacle transverse to the fluid flow, and
  V is the fluid speed,
remains constant; in other words, the vortex frequency is closely proportional to the fluid speed.

However, it has been found that for a Reynolds number at the obstacle less than 20,000 that is for example for low flow of gas at low pressure, the average vortex frequency would be higher than the theoretical value derived from the above equation. Thus the error of the flowmeter expressed as a function of flowrate is constant for gas pressures above about 4 bars, but rises by several percent at low flowrates, causing an overestimate when the pressure of the gas being metered is very low.

This type of error is particularly disadvantageous in relation to the calibration of gas meters, generally calibrated at atmospheric pressure though they will subsequently be applied to the metering of gas under pressure.

Analysis of the flowmeter signal with a spectrum analyser has confirmed that the increase in error is not due to the appearance of parasitic oscillation, but rather is due to an inherent property of the turbulent flow.

SUMMARY OF THE INVENTION

An object of the invention is to provide a flowmeter for which the error curve as a function of flowrate is substantially improved, not only for low Reynolds numbers, but also over the whole measuring range, over which irregularities of the curve are reduced.

The Applicant has found that the error characteristic of this type of flowmeter could be substantially reduced by associating a mesh structure with the obstacle, this structure being placed and dimensioned in a characteristic manner upstream of the obstacle.

According to the invention, the mesh structure is a mesh grid made of bars of rectangular or square cross-section, said grid being placed at a distance from the vortex-shedding obstacle comprised between about D and 5D, where D is the conduit diameter through which the fluid to be metered flows.

The term "grid" is used to mean a characteristic structure of bars assembled to form square or rectangular meshes whose function is substantially to act on the fluid flow in a working zone upstream of the obstacle in order to make the turbulence level of the fluid more uniform and reduce the irregularities of the profile of the flow speeds which can result from imperfections on the conduit walls.

It should be mentioned that such a grid has a structure and a function totally different from a tranquilliser, for example made of a bundle of tubes or of the honeycomb type, which is only useful for reducing the non-axial components of the flow speed; the grid used in the present invention is more akin to the element usually placed at the inlet of a wind-tunnel to condition the air flow before passing around the test model.

BRIEF DESCRIPTION OF THE DRAWING

A vortex fluid flowmeter in accordance with the invention will now be described, by way of exemple, with reference to the accompanying drawing in which.

DESCRIPTION OF THE PREFERRED EMBODIMENT

Figure 1:
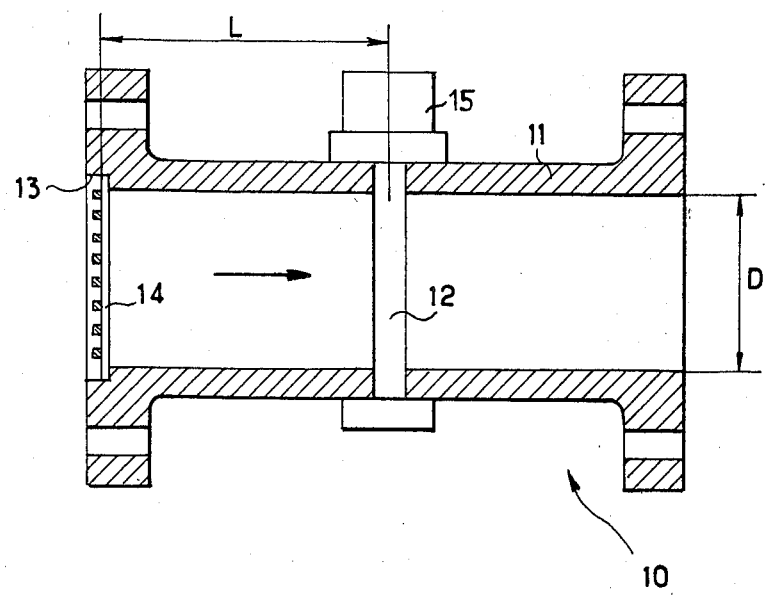
FIG. 1 is a schematic axial section of a flowmeter, the section passing through the medium line of the obstacle of the flowmeter.

Referring to FIG. 1, a flowmeter 10 is shown comprising a circular conduit element 11 of internal diameter D intended to be connected in the usual manner by means of end flanges to a conduit through which the flow to be measured passes (in the direction of the arrowl). A vortex shedding obstacle 12 is mounted diametrically across the conduit element 11 in its median plane perpendicular to the direction of flow of the fluid. In this embodiment the length of the conduit element is equal to 3D, the obstacle 12 is rectangular in cross-section and its width (h) transverse to the fluid flow is equal to 0.23D. At the left end of the conduit element 11 forming the input of the fluid flow a groove 13 is provided at a distance of L=1.50D from the medium line of obstacle 12, in which the periphery of a grid 14 mounted perpendicular to the fluid flow can be lodged. The flowmeter 10 also comprises a sensor 15 responsive to the emission of the vortices, which is embodied partially into the obstacle 12, for producing electrical signals related to the flowrate of the fluid, for instance of the piezoelectric type.

Figure 2:
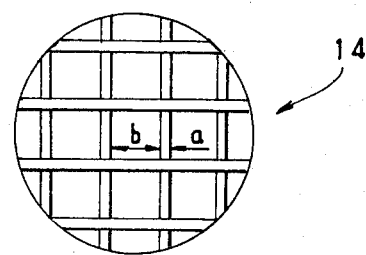
FIG. 2 is a front view of the grid represented on a larger scale.

The grid 14 shown enlarged in the front view of FIG. 2 is a square-meshed grid and formed by soldering of two series of regularly spaced bars or wires of square cross-section superposed perpendicularly one over another. The dimension a of a bar transverse to the fluid flow is chosen equal to about 0.013D and the spacing b between two consecutive bars is about 0.066D, which gives the grid mesh size b+a equal to about 0.08D.

The mounting of this grid 14 at the specified distance 1.5D upstream of the obstacle 11 results in producing a turbulence level in the vicinity of the obstacle 12 approximately constant whatever the conditions of turbulence may be in the flow upstream the conduit element 11. Thus a stabilisation of the emission of the alternating vortices is obtained and consequently the error of the flowmeter in the measuring range is practically free of irregularities.

Of course the invention is not limited to the embodiment above described by way of example in which the stated values have been chosen optimally. The distance between the grid 14 and the obstacle 11 as well as the structural characteristics (a and b) of the grid can have different values from those indicated above, provided however that the distance from gid to obstacle is not chosen too high, nor too low, in order that the obstacle remains in the efficient working range of the grid, that is comprised between about D and 5D upstream of the obstacle, and that the characteristic dimension a, b of the grid preferably vary only about 10% from the values given above, and remain adapted to the other parameters L and h defining the obstacle in relation to the grid. Also the grid bars need not necessarily have a square cross-section, but can have a rectangular cross-section, the ratio of depth (parallel to the fluid flow) to width (transverse to the fluid flow) being comprised between 1 and 1.7; with the smaller dimension a being perpendicular to the direction of flow of the fluid.

Thus, the thickness of the grid parallel to the fluid flow ranges from a (a=0.013D) to 1.7a. Since mesh size equals a+b (b=0.066D), the ratio of grid thickness to mesh size will range between $a/(a+b) = 0.013D/(0.013D+0.066D) \mp 0.16$ and $1.7a/(a+b) = 1.7(0.013D)/(0.013D+0.066D) \approx 0.28$.

What is claimed is:

1. A vortex fluid flowmeter comprising: circular conduit means having an internal diameter D; an obstacle disposed within said conduit means transversely thereof for generating vortices in fluid flowing through said conduit means; sensor means responsive to the emission of said fluid; a mesh structure disposed within said conduit means perpendicular to the direction of the fluid on the upstream side of said obstacle wherein said mesh structure is a grid made of bars rectangular in cross-section placed at a distance from said obstacle comprised between about D and 5 D said grid having a ratio of thickness parallel to the fluid flow to the mesh size in the range between about 0.16 and about 0.28.

2. A vortex fluid flowmeter according to claim 1, wherein said distance is equal to about 1.5D.

3. A vortex fluid flowmeter according to claim 1, wherein said grid has a mesh size equal to about 0.08D.

4. A vortex fluid flowmeter according to claim 1, wherein bars of said grid have a dimension transverse to the fluid flow equal to about 0.013D.

* * * * *